Figure 8:
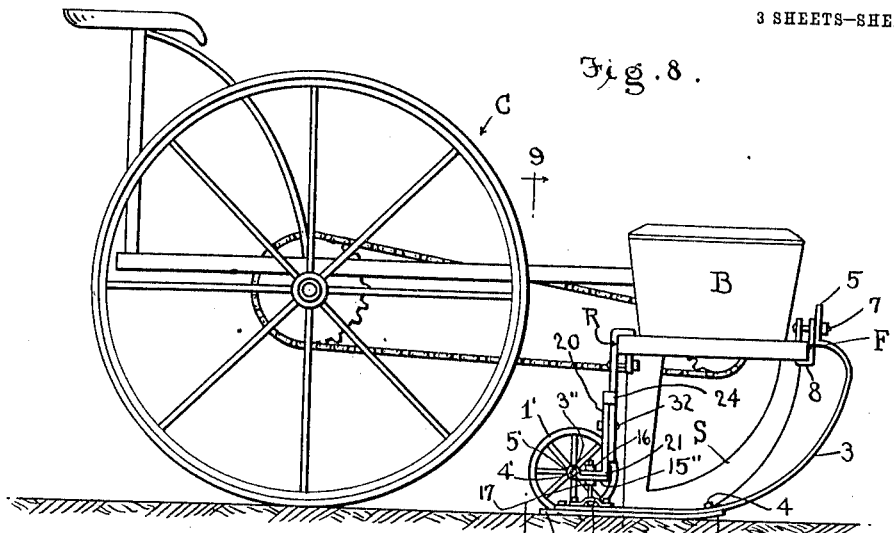

J. B. ALLBEE.
CORN PLANTER ATTACHMENT.
APPLICATION FILED MAY 29, 1913.
1,089,893.
Patented Mar. 10, 1914.
3 SHEETS—SHEET 1.
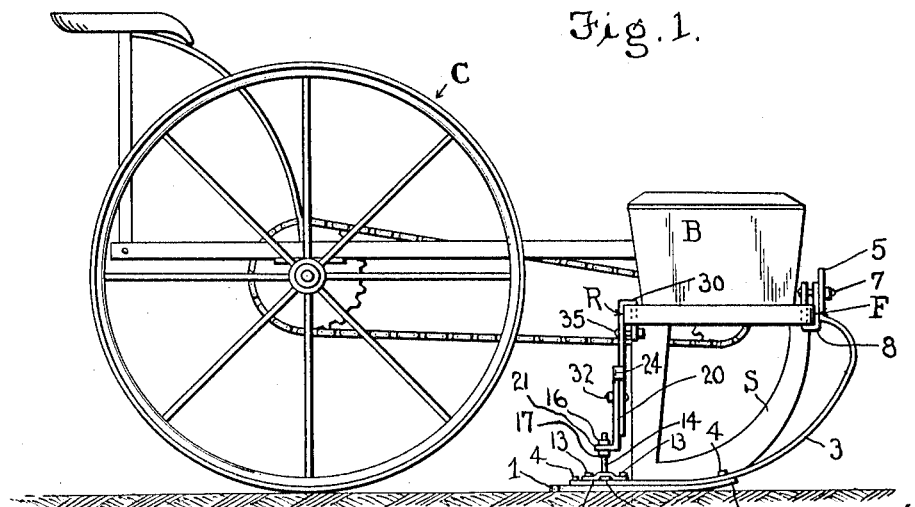
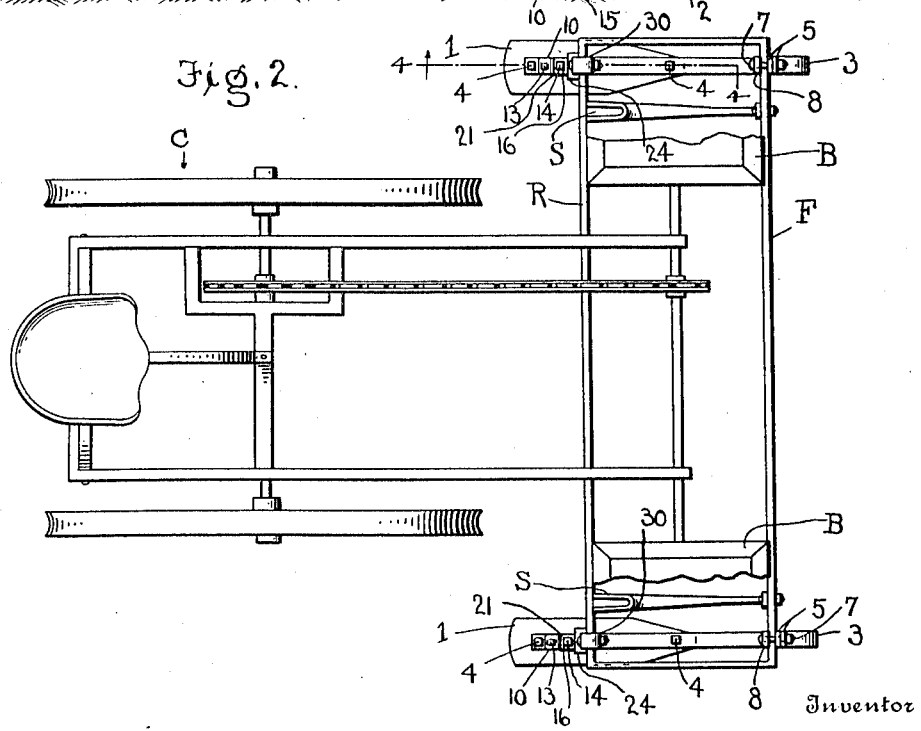
Witnesses
L. B. James
N. L. Cramer
Inventor
John B. Allbee
By H. B. Willson &co.
Attorneys

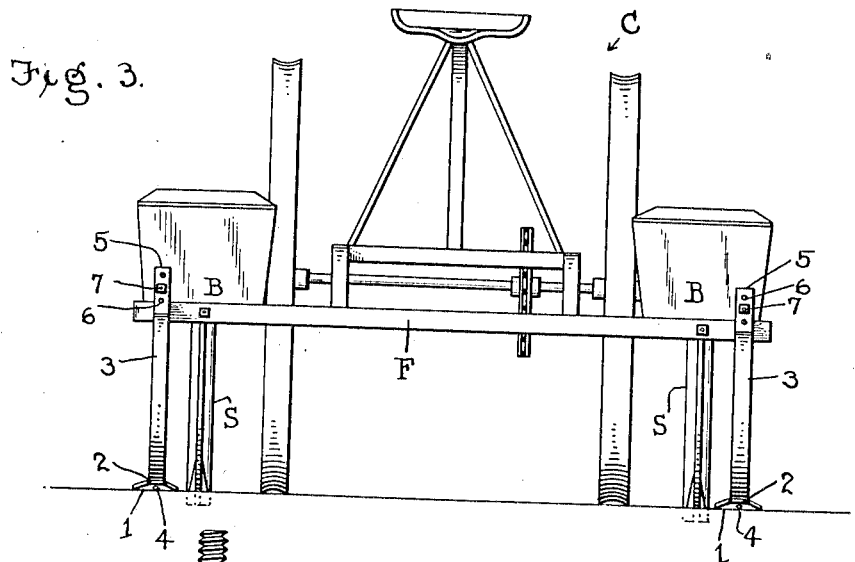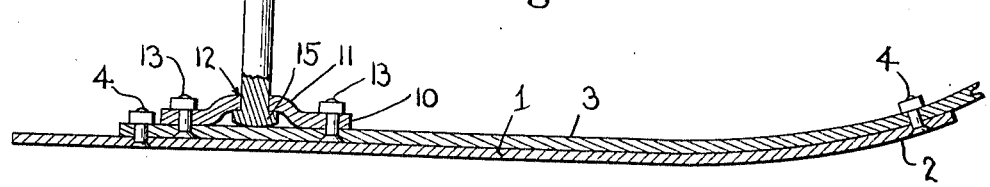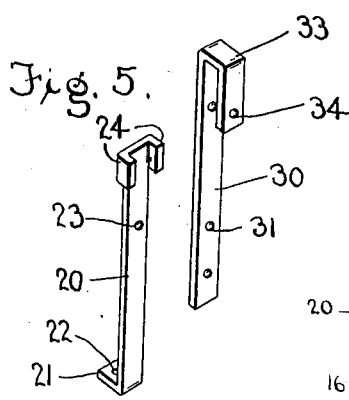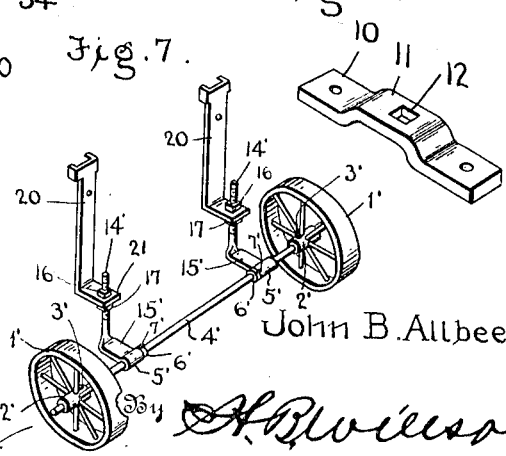

J. B. ALLBEE.
CORN PLANTER ATTACHMENT.
APPLICATION FILED MAY 29, 1913.

1,089,893.

Patented Mar. 10, 1914.
3 SHEETS—SHEET 3.

Witnesses
L. B. James
J. Ralph Hoge

Inventor
John B. Allbee
By H. B. Wilson &co
Attorneys

UNITED STATES PATENT OFFICE.

JOHN B. ALLBEE, OF PLOVER, IOWA.

CORN-PLANTER ATTACHMENT.

1,089,893.  Specification of Letters Patent.  Patented Mar. 10, 1914.

Application filed May 29, 1913. Serial No. 770,788.

*To all whom it may concern:*

Be it known that I, JOHN B. ALLBEE, a citizen of the United States, residing at Plover, in the county of Pocahontas and State of Iowa, have invented certain new and useful Improvements in Corn-Planter Attachments; and I do declare the following to be a full, clear, and exact description of the invention, such as will enable others skilled in the art to which it appertains to make and use the same.

This invention relates to corn planters, and the object of the same is to produce an attachment capable of being applied to such a machine and including a gage rigidly held by the framework of the planter and adjustable with respect thereto so that the shoe of the planter may be caused to enter the earth only to the distance required.

This object is carried out by constructing the attachment in the manner hereinafter more fully described and claimed, and as shown in the drawings wherein—

Figure 1 is a side elevation and Fig. 2 a plan view of a corn planter with this attachment in place thereon, one of the seed boxes in Fig. 2 being broken away. Fig. 3 is a front elevation of the planter and attachment. Fig. 4 is an enlarged longitudinal section of the shoe form of gage and a portion of its support taken about on the line 4—4 of Fig. 2. Fig. 5 is a perspective detail of the two members constituting the remainder of said support, and Fig. 6 is a perspective detail of the clip plate by which the support is attached to the shoe. Fig. 7 is a perspective detail of a modified form on a reduced scale, showing the wheel form of gage and part of the support therefor. Fig. 8 is a side view and Fig. 9 a cross section on the line 9—9 of Fig. 8 showing an amplified form of this device. Fig. 10 is a perspective detail of the lowermost member and the bearing for the wheel-shaft which is used with the form of machine shown in Figs. 8 and 9.

In the drawings the letter C designates a corn planter of any suitable type, but the one illustrated herein has a framework consisting of front and rear bars F and R carrying seed boxes B, B, at their extremities, and shoes S beneath said boxes. The construction and mechanism of this corn planter is not essential to the present invention, save that I propose to make my attachment in such form that it may be applied to the framework of a corn planter of this character, or if the corn planter be of some different type the support and connection of this attachment will be modified accordingly.

Coming now more particularly to the details of the present invention, the numeral 1 designates a flat shoe made of sheet metal perhaps six inches wide and tapering and upturned at its front end as at 2, and 3 is a rib as of strap metal which is secured along the length of said shoe on its upper side by rivets or bolts 4 whose heads are countersunk into the lower face of the shoe and whose nuts stand above said rib so that they will not become clogged with earth. This rib extends forward of and rises from the shoe as best seen in Fig. 1, and its upper extremity 5 is vertical and is pierced with a series of holes 6 as best seen in Fig. 3; and through one of said holes is passed a bolt 7 which may be connected with the front bar F of the planter frame in any suitable way, preferably by means of a clip 8 of U-shaped construction which the tightening up of the nut on the bolt 7 clamps upon said front bar in a manner which will be clear. The upturned end of the rib 3 and this attaching device therefore constitute a means for supporting the front end of the shoe.

Secured upon the rear end of the rib is a clip plate best seen in Fig. 6. This consists of a short strip 10 of metal having its center 11 unbent and pierced with a hole 12, and its ends are connected by rivets or bolts 13 with the rib 3—their heads preferably being disposed downward and countersunk in the lower face of said rib and their nuts disposed above the downturned ends of the clip plate so that they may be readily accessible. Through said hole 12 projects a bolt 14 whose head 15 stands beneath the upbent center 11 of the clip plate and whose shank rises therefrom as seen in Fig. 4, and two nuts 16 and 17 are engaged with the threaded shank of this bolt. This element forms one portion of the support at the rear of the shoe. The other portion thereof is made up of the two members telescopically mounted on each other, and their construction is best seen in Fig. 5. The lowermost member 20 has its lower end bent to the rear as at 21 and pierced with an eye 22 through which said bolt projects, and the nuts 16 and 17 are tightened upon said lower end above and below it as seen in Fig. 1. The body of this member 20 is pierced with a bolt hole 23, and its upper end is formed into two tongues 24 which are bent forwardly in parallelism with each other. The other member 30, also of strap metal, is of a size to pass between said tongues 24, and its lower end is pierced with a series of holes 31 which may be brought successively into register with said hole 23 so that they may be connected by a bolt 32—thereby permitting the adjustment of these members upon each other in addition to the adjustment between the lower end 21 of the lower member and the bolt 14 which is permitted by means of the two nuts 16 and 17. The upper end of the upper member 30 is connected to the rear bar R of the planter frame in any suitable manner, preferably by being turned over as shown at 33 and its body and its turned over portion pierced with alined holes 34 through which may pass a bolt 35 beneath the frame bar R as seen in Fig. 1. When this bolt is tightened up the hooked upper end of the upper member 30 is clamped upon the bar—when it is loosened this end may be adjusted longitudinally of said frame bar R, or when the bolt is withdrawn this member can be entirely disconnected therefrom.

All parts of the device are preferably of metal, and those that are subjected to the most wear may be tempered. As above suggested, with other types of corn planters it may be necessary to alter the structure slightly, but I prefer to retain the flat, rather wide shoe 1 and the rib 3 secured along its upper face and upturned at its front end, and I prefer to connect the extended front end of this rib with the framework of the corn planter at one point, while I prefer to connect the rear end of this rib by some extensible form of connection with the framework of the corn planter at another point.

From this construction it follows that when this device is attached to a corn planter, a slight adjustment of the position of the shoes may be effected by loosening the nuts 16 and 17 and resetting them so as to let the planter shoes farther downward or draw them farther upward with respect to the lower end of the drill; and a greater degree of adjustment may be effected, or the same slight degree of adjustment effected through a different path, by setting the bolt 32 in some of the other holes 31 through the upper member 30, and then adjusting the nuts on the bolt 14 as above described.

In Fig. 2 I have shown the attachment as applied to the corn planter frame outside its shoes, although it is not necessary that it occupy that exact position.

In Fig. 7 I have shown a slightly modified form of this attachment, wherein the gage is in the form of a pair of rollers 1' (instead of the flat shoe 1) each having a hub 2' adjustable lengthwise by means of a set screw 3' on a longitudinal shaft 4', and the latter is journaled in bearings 5' formed at the extremities of lateral offsets 15'' which are in effect the heads of upright bolts 14' whose threaded shanks carry the nuts 16 and 17 above described and are thereby adjustably held in the eyes of the rearwardly bent ends 21 of said lowermost members 20 described above. With some kinds of soil it may be desirable to substitute rollers 1' for the flat shoes 1 above described, and it is obvious that by removing the nut 16 on the bolt 14 the latter may be entirely withdrawn and the bolt 14' substituted therefor, whereby the shaft 4' and its rollers will be adjustably supported in the same manner as the shoe form of gage. This modification of my invention, however, possesses the additional advantage that if collars 6' are placed on the shaft 4' and rendered adjustable by set screws 7', the entire shaft can be held in one position between the bearings 5' or can be adjusted longitudinally therein; whereas by loosening the set screws 3' the hubs 2' of the wheels 1' may be adjusted with respect to the shaft. This renders it possible to locate the wheel or roller form of gage either outside of the planter shoes S as shown in Fig. 2 with respect to the shoe form of gage, or inside said shoes if desired, and at such a distance from them as the nature of the soil demands.

Figure 9:
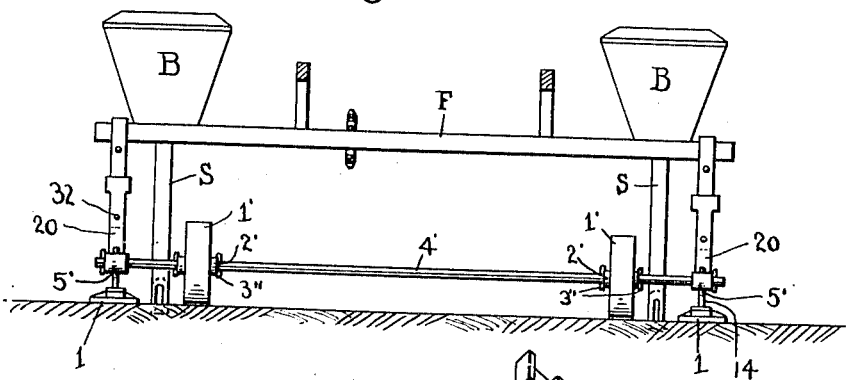
Figure 10:
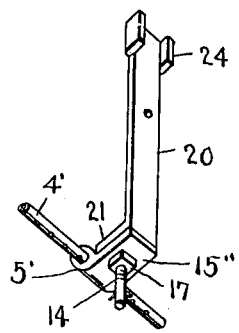

It is quite possible that in some cases the user may prefer to employ the roller form of gage at one side of the corn planter and the shoe form of gage at the other side, or at one or both sides of the machine he may employ both forms of gage, putting the shoe form for instance on the outer side of the planter shoe, as seen in Figs. 8 and 9, and the roller form of gage on the inner side of said shoe and spacing each form as far from the shoe S as the nature of the soil demands. In this case the wheels or rollers 1' have their hubs 2' adjustable lengthwise by split pins or other devices 3'' on the shaft 4' and the latter is journaled in bearings 5' formed at the extremities of plates 15''. As seen in Fig. 10, each plate is pierced with an eye threaded onto the upright bolt 14 beneath the rearwardly bent portion 21 of the lowermost member 20 and above the lower nut 17; and therefore this shaft and the wheels which it carries is adjustable vertically when said lowermost member is adjusted. In this case, the setting of the nuts 16 and 17 pushes the shank of the bolt 14 downward, depresses the gage and therefore lets the planter shoe into the earth a lesser distance, whereas a reverse setting of the nuts raises the gage and lets the planter shoe S enter the ground to a greater degree.

What is claimed as new is:

1. In a corn planter attachment for the purpose set forth, the combination with a flat shoe slightly upturned at its front end; of a rib secured upon and along the central line of said shoe with its forward end extending beyond the front end of the shoe and upturned, means for attaching its upper extremity to the frame of a corn planter, a support connecting the rear end of said rib with the frame of the corn planter, and means for adjusting the length of said support.

2. In a corn planter attachment for the purpose set forth, the combination with a flat shoe slightly upturned at its front end; of a rib secured upon and along the central line of said shoe with its forward end extending beyond the front end of the shoe and upturned, means for attaching its upper extremity to the frame of a corn planter, a bolt whose head is connected with the rear end of said rib and whose threaded shank stands uppermost, a pair of members telescopically mounted upon each other and the lowermost having a horizontally projecting lower extremity pierced with an eye engaging said bolt, means for attaching the upper end of the uppermost member to the frame of the corn planter, and nuts on the threaded shank of said bolt above and below the eye in the rearwardly turned end of said lower member.

3. In a corn planter attachment for the purpose set forth, the combination with a flat shoe tapering toward its front end; of a rib secured upon and along the central line of said shoe with its forward end extending beyond the front end of the shoe and upturned, means for attaching its upper extremity to the frame of a corn planter, a clip plate having its ends secured upon said rib and its center raised and pierced with a hole, a bolt having its head disposed between said clip plate and rib and its shank projecting through said hole with its threaded end uppermost, two nuts on said threaded end, and a support consisting of two members telescopically mounted upon each other with the upper end of the uppermost member engaging the frame of the corn planter and the lower end of the lowermost member turned to the rear and pierced with an eye engaging said bolt between the nuts.

4. In a corn planter attachment for the purpose set forth, the combination with a flat shoe tapering toward its front end; of a rib secured upon and along the central line of said shoe with its forward end extending beyond the front end of the shoe and upturned, means for attaching its upper extremity to the frame of a corn planter, a clip plate having its ends secured upon said rib and its center raised and pierced with a hole, a bolt having its head disposed between said clip plate and rib and its shank projecting through said hole with its threaded end uppermost, two nuts on said threaded end, an upright member of strap iron having its lower end turned to the rear and pierced with an eye engaging said bolt between said nuts and its upper end formed into tongues projecting forwardly in parallelism with each other, an upper member having its upper end hooked over the frame of the corn planter and secured thereto and its body pierced with a series of holes, the body of the lower member having a single hole, and a bolt passing through one of said series in one member and through the single hole in the other member, for the purpose set forth.

5. In an attachment for corn planters, the combination with a flat shoe tapering toward its front end, and a rib of strap iron secured upon and throughout the length of said shoe and having an upturned front extremity adapted to be secured to the frame of the corn planter; of a bolt whose head is secured to the rear end of said rib and whose threaded shank stands uppermost, a pair of nuts on said shank, an upright member of strap iron having its lower end turned to the rear and pierced with an eye engaging said bolt between said nuts and its upper end formed into tongues projecting forwardly in parallelism with each other, an upper member having its upper end adapted to be hooked over the frame of the corn planter and secured thereto and its body pierced with a series of holes, the body of the lower member having a single hole, and a bolt passing through one of said series in one member and through the single hole in the other member, for the purpose set forth.

6. In an attachment for corn planters, the combination with a flat shoe slightly upturned at its front end; of a bolt whose head is connected with said shoe and whose threaded shank stands uppermost, a pair of nuts on said shank, an upright member of strap iron having its lower end turned to the rear and pierced with an eye engaging said bolt between said nuts and its upper end formed into tongues projecting forwardly in parallelism with each other, an upper member having its upper end adapted to be hooked over the frame of the corn planter and secured thereto and its body pierced with a series of holes, the body of the lower member having a single hole, and a bolt passing through one of said series in one member and through the single hole in the other member, for the purpose set forth.

7. In a corn planter attachment for the purpose set forth, the combination with a flat shoe slightly upturned at its front end; of a clip plate having its ends connected with said shoe and its center raised and pierced with a hole, a bolt having its head disposed between said clip plate and rib and its shank projecting through said hole with its threaded end uppermost, two nuts on said threaded end, and a support consisting of two members telescopically mounted upon each other with the upper end of the uppermost member adapted to engage the frame of the corn planter and the lower end of the lowermost member turned to the rear and pierced with an eye engaging said bolt between the nuts.

8. In a corn planter attachment for the purpose set forth, the combination with a support consisting of two members telescopically mounted upon each other and the lowermost having its ends turned to the rear and pierced with an eye, and means for detachably connecting the upper end of the uppermost member with the planter-frame; of an upright bolt having its shank passing upward through said eye, nuts on such shank above and below the pierced end of said lowermost member, and a gage carried by the head of said bolt.

9. In a corn planter attachment for the purpose set forth, the combination with a support consisting of two pairs of members, those of each pair adjustable vertically with respect to each other, the lowermost members having their lower ends turned to the rear and pierced with eyes, and means for adjustably attaching the upper ends of the uppermost members to the planter-frame; of a pair of bolts having their shanks adjustable vertically in said eyes and their heads disposed downward, and a pair of gages carried by said heads and adapted for adjustment vertically and laterally with respect to the corn-planter shoes.

10. In a corn planter attachment for the purpose set forth, the combination with a support consisting of two pairs of members, those of each pair adjustable vertically with respect to each other, the lowermost members having their lower ends turned to the rear and pierced with eyes, and means for adjustably attaching the upper ends of the uppermost members to the planter-frame; of a pair of bolts having their shanks passing vertically through said eyes, shoes carried by their lower ends, a pair of plates underlying the rearwardly turned ends of said lowermost members and pierced with holes through which said bolt-shanks pass, nuts above said end and below said plates for the purpose set forth, bearings carried by said plates, a cross shaft journaled therein, and a pair of wheels adjustably mounted on said shaft with respect to the corn planter shoes.

In testimony whereof I have hereunto set my hand in presence of two subscribing witnesses.

JOHN B. ALLBEE.

Witnesses:
J. D. WALLACE,
GEO. S. SHAW.

---

Copies of this patent may be obtained for five cents each, by addressing the "Commissioner of Patents, Washington, D. C."